Dec. 1, 1936.　　　R. D. ACTON　　　2,062,282
TRACTOR PLANTER
Filed July 30, 1934　　　2 Sheets-Sheet 1
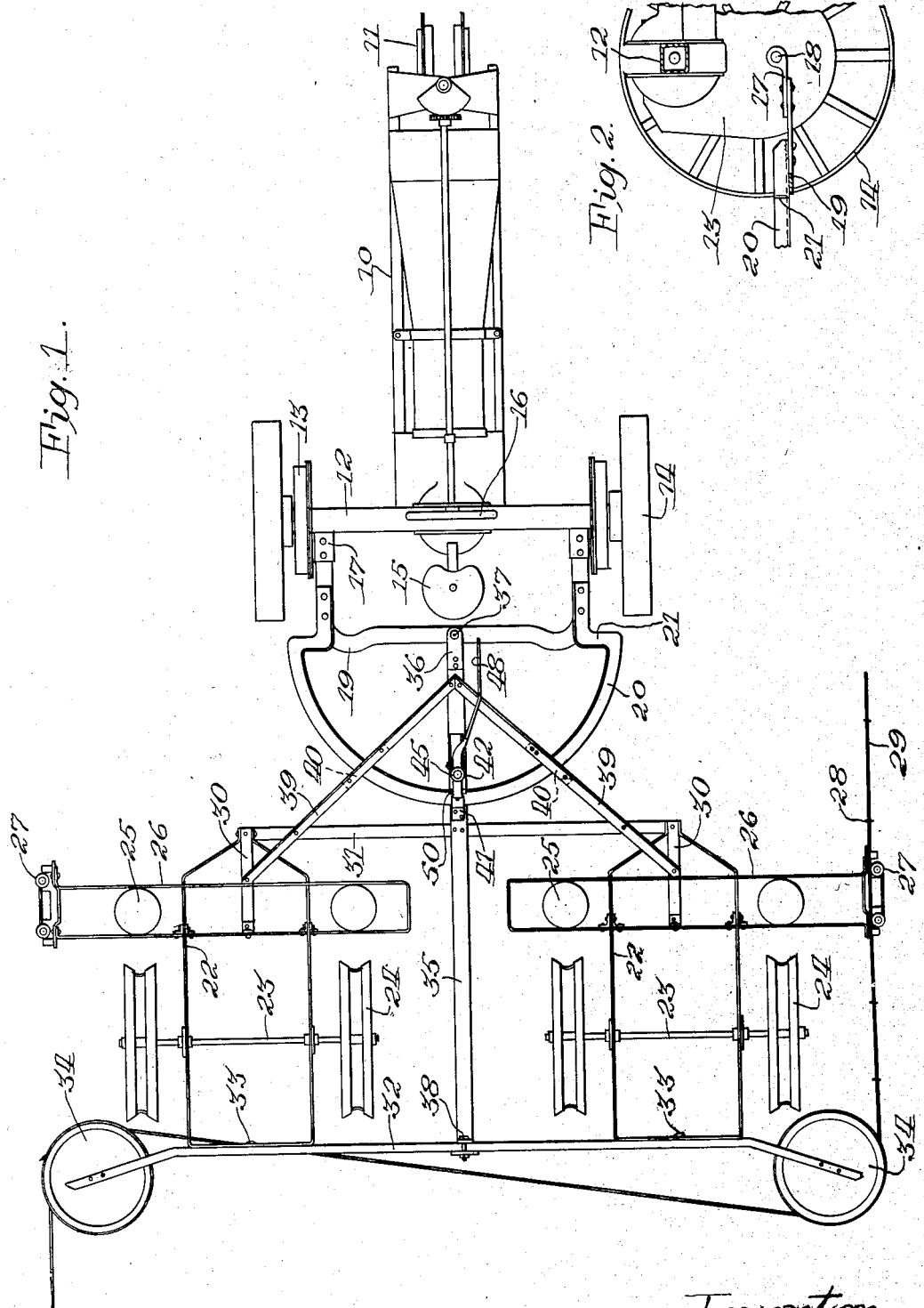
Inventor
Russell D. Acton

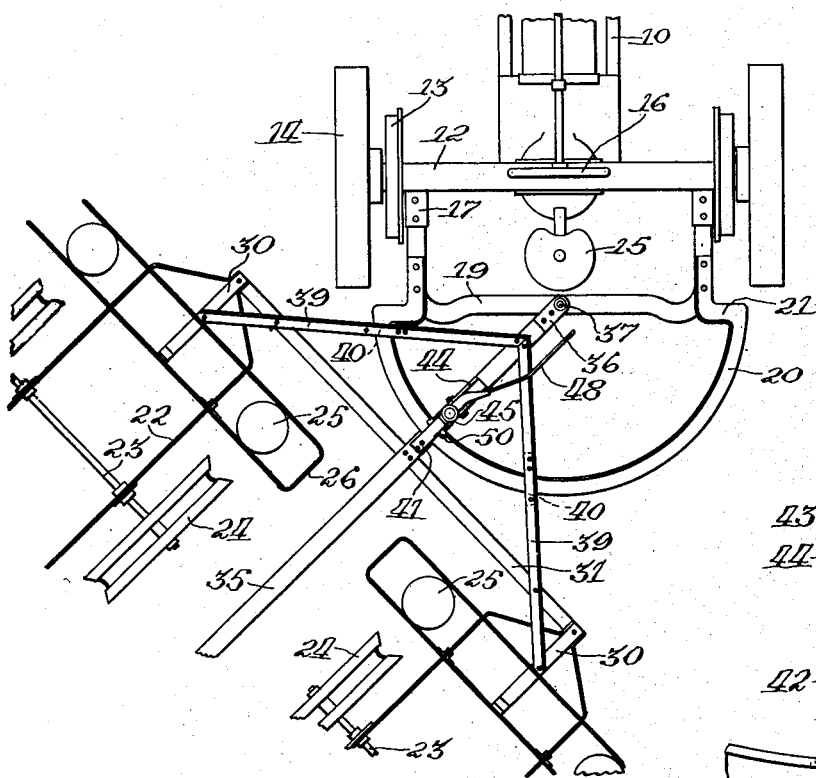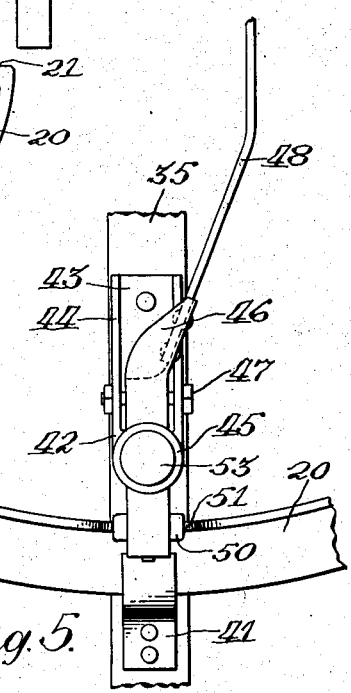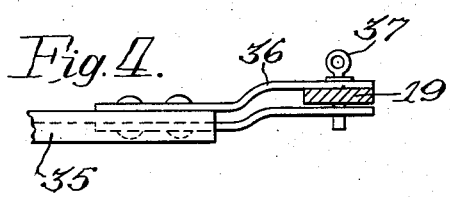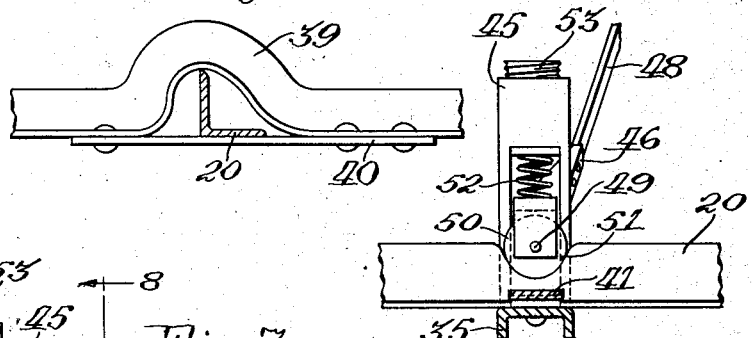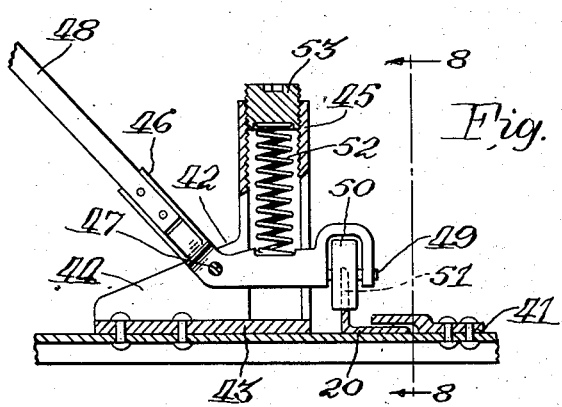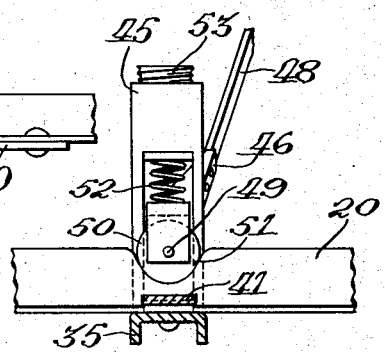

Patented Dec. 1, 1936

2,062,282

UNITED STATES PATENT OFFICE 2,062,282

TRACTOR PLANTER

Russel D. Acton, Chicago, Ill., assignor to International Harvester Company, a corporation of New Jersey Application July 30, 1934, Serial No. 737,525

12 Claims. (Cl. 111—20)

This invention relates to a tractor attached implement.

More particularly it relates to an implement, such as a check-row planter, which is drawn behind the tractor rigid with respect thereto in normal operation and pivotal with respect to the tractor for turning.

The principal object of the present invention is to devise a tractor attached implement which overcomes defects present in implements drawn behind tractors, particularly on side hill work.

Another principal object is to devise a planter utilizing a check wire which is not deflected from its true course by torque applied by the check wire.

These two principal objects and others which will be apparent from the detailed description to follow are accomplished by a construction such as shown in the drawings, in which:

Figure 1 is a top plan view of a conventional tricycle type tractor with an implement embodying the invention attached thereto;

Figure 2 is an enlarged sectional view through the rear axle, showing the connecting means between the draft frame and the tractor;

Figure 3 is a plan view, partly broken away, to show the implement in pivoted position with respect to the tractor;

Figure 4 is an enlarged sectional detail of the connection between the implement frame and the drawbar of the tractor;

Figure 5 is an enlarged plan view of the latch means between the implement frame and the draft frame;

Figure 6 is an enlarged sectional detail of the sliding connection between the implement frame brace bars and the draft frame;

Figure 7 is an enlarged vertical section of the latch means between the implement frame and the draft frame; and, Figure 8 is an enlarged transverse vertical section, as seen on the line 8—8 of Figure 7, of a portion of the draft frame and implement frame, showing the latch means in elevation.

In the operation of implements drawn behind tractors, it has been customary to pivotally attach the implements to the rear of the tractor. For certain kinds of work, for example, when drawing agricultural implements over sloping side hills, the implement has a tendency to swing to the side down the slope. This is very objectionable, particularly when row crops are being planted or operated upon, and may also be objectionable when harvesting either row crops or other grain. When planting with a multiple row planter, the distance which the check wire must be moved is so great that a construction has come into use in which the check wire is carried by transversely spaced guides. It will be obvious by inspecting Figure 1 of the drawings that, when a planter is pivoted to the rear of a tractor and transversely spaced guides are utilized, tension on the check wire acts to rotate the planter about its pivot axis on the tractor. It is to overcome this objectionable angular movement and similar movement due to sloping side hills that the present invention has been devised.

In the drawings, a conventional tractor of wide tread, tricycle type has been shown. Said tractor has a narrow body portion 10, a narrow, rolling front support 11, a transversely extending rear axle structure 12, depending housings 13 at the ends of said axle structure, and drive wheels 14 mounted on said housings. An operator's seat 15 is mounted at the rear of the tractor in proximity to the steering wheel 16. At the lower, inner sides of the depending housings 13, bearing brackets 17 are pivotally mounted on trunnions 18. A U-shaped drawbar 19 is rigidly secured to the brackets 17. Said drawbar extends rearwardly with its transverse portion somewhat to the rear of the tread line of the traction wheels 14.

An arcuate angle bar 20, formed as a portion of a circle having its center at the center of the drawbar 19, is rigidly connected to the longitudinal portions of the drawbar 19. The arcuate portion extends somewhat beyond the drawbar and is provided with set back portions 21 adjacent the wheels 14, which have a function to be hereinafter described.

The planter, which is connected to the tractor, has been somewhat diagrammatically represented as including two independent two-row planters having frames 22 supported on axles 23, which carry the usual planter covering wheels 24. The usual seeding mechanism is mounted on the planter frames 23, being diagrammatically illustrated as seed hoppers 25 mounted on a transverse frame 26. The particular seed dispensing and furrow opening means to be utilized may be of any conventional construction and has not been shown, as it forms no part of the present invention. At the outer ends of the frames 26, check heads 27 of a conventional construction are mounted. These heads are adapted to engage the check buttons 28 of a check wire 29, which is stretched across the field in the usual manner for operating the seeding mechanisms of the planter. A four-row planter construction adapted for use in the implement shown may be similar to that shown in United States Patent No. 1,811,041.

The planter frames 22 are connected by stub tongues 30 at their forward ends to a transverse bar 31, which accurately spaces the planter units and provides means for attaching the units to the frame structure by which the planters are attached to the tractor.

At the rear of the frames 22, a transverse bar 32 is pivotally connected by bolts 33 to accurately space the rear of the planters and to provide for the flexibility required in passing over uneven ground. The transverse bar 32 is extended beyond the planter frames and carries at the outer ends thereof grooved check wire sheaves 34 mounted on vertical axes. The check wire 29 passes along one side of the tractor around the rear of one of the sheaves 34, across behind the planters, and around the forward side of the other sheave. The check wire extends therefrom rearwardly across the field and is fastened in the usual manner. This cross check wire arrangement is not a part of the present invention, it being shown as a tractor planter attachment in United States Patent No. 1,964,582 issued June 26, 1934.

To complete the planter frame structure, a heavy channel bar 35 extends longitudinally from the rear bar 32 over the forward bar 31 and to the drawbar of the tractor to which it is pivotally attached by bars 36 forming a clevis and a pin 37, as shown in Figure 4. The bar 35 is rigidly connected to the bar 31 and pivotally connected to the bar 32 by a bolt 38, to permit a certain amount of flexibility. Forwardly and inwardly extending angle bars 39 are connected to the stub tongues 30, the transverse bar 31, and the channel bar 35. Said bars are bent upwardly, as shown in Figure 6, to pass over the angle bar 20, plates 40 being secured beneath the angle bars 20, forming thereby a slidable guide.

With the planter frame structure as described, being pivotally attached to the drawbar portion of the draft frame and being slidable with respect to the arcuate portion of the draft frame, the planter structure is free to pivot about a vertical axis. There is also sufficient flexibility in the connections to permit a limited amout of flexing about a longitudinal axis to permit the planter units to accommodate themselves to uneven ground. To provide means for locking the implement against pivoting including means for automatic release upon a predetermined torque, and for manual release when desired, a particular latch mechanism has been devised. It is in this mechanism and its combination with the draft frame and implement frame structure that the invention resides.

Adjacent the arcuate angle bar 20 a guiding member 41, rigidly secured to the channel bar 35, extends over the horizontal web of the angle bar to permit relative movement of the two bars and to prevent vertical displacement. A member 42 formed as a casting is mounted on the bar 35 opposite the member 41. Said casting is formed with an attaching base portion 43, spaced side members 44 extending upwardly from the base portion, and a hollow vertical extension 45. A latch carrier member 46 extends between the side portions 44 and is pivoted thereto on a pin 47. An operating handle 48 extending upwardly and forwardly to a position within reach of the operator is secured to the member 46. The member 46 extends forwardly over the angle bar 20 and carries a roller 50 pivotally mounted on a longitudinal pin 49. Said roller, when engaged, seats in a substantially semicircular notch 51 formed in the vertical web of the angle bar 20. This notch may be of a diameter slightly larger than the roller and may be enlarged in diameter near its upper edge, or curved outwardly to permit disengagement of the roller 50.

A spring 52 is seated against the upper side of the member 46 and against an adjustable threaded plug 53 screwed into a bore formed in the hollow extension 45.

The operation of the tractor attached planter as above described will be understood from the nature of the construction. When the roller 50 is seated in the notch 51 and resiliently held therein by the spring 52, the entire planter frame structure is rigid with respect to the tractor about a vertical axis, while free to pivot with respect to the tractor on a transverse horizontal axis extending through the trunnions 18. It will be understood that a tractor is relatively heavy compared to the implements usually drawn therebehind. The tractor is also usually provided with traction lugs, which tend to hold it against annular slipping on side hills and against angling when torque, such as side draft, is applied thereto. For that reason, if the implement is secured to the tractor against pivoting on a vertical axis, the tractor is effective to hold the implement against angling with a reasonable amount of torque. It is, however, necessary, when turning at the ends of a field, to release the implement in order to make a turn of sufficiently small radius. It is also desirable, if the implement is to be rigidly attached in so far as angular movement about a vertical axis is concerned, to provide an automatic release to prevent breakage when a large torque may be suddenly applied to the implement.

It will be understood that the roller 50, as held in position by the spring 52, will be released by a predetermined torque on the planter structure; that is, by sufficient force laterally against the roller. By suitable selection of a spring and by properly forming the notch 51, the latch may be constructed to release at any predetermined amount of torque on the planter structure. The adjustable plug 53 may be utilized to take care of wear or other conditions which may arise, causing the latch to release sooner or later than required.

To provide for releasing the planter at the end of the row, the lever 48 is extended within reach of the operator. This lever may be held down until the turn has been started, whereby it will automatically reengage as soon as the planter structure has released itself with respect to the tractor. This engagement may be secured at the beginning of the row by manipulating the tractor until the latch is seated.

As above pointed out, applicant has described two conditions; that is, side hill work and cross sheave check-row planter operation, in which his invention functions to accomplish a desirable result. It is to be understood, however, that he claims as his invention all uses and all modifications falling within the scope of the appended claims.

What is claimed is:

1. A tractor attached implement comprising, in combination with a tractor, a rearwardly extending draft frame pivotally connected on a transverse axis to the tractor, an implement frame structure pivotally connected on a vertical axis to said draft frame, and latch means associated with said pivotal connection for holding the frame structure against pivotal movement with respect to the draft frame, said means including detent mechanism releasable for pivotal movement of the implement frame with respect to the draft frame by application of a predetermined torque on the frame structure.

2. A tractor attached implement comprising, in combination with a tractor, a rearwardly extending draft frame pivotally connected to said tractor on a transverse axis, a check-row planter pivotally connected on a vertical axis to said draft frame, transversely spaced check wire guides mounted on said planter, and latch means for holding the planter against pivotal movement with respect to the draft frame, said means being releasable for pivotal movement of the planter.

3. A tractor attached implement comprising, in combination with a tractor, a rearwardly extending draft frame pivotally connected to said tractor on a transverse axis, a check-row planter pivotally connected on a vertical axis to said draft frame, transversely spaced check wire guides mounted on said planter, and latch means for holding the planter against pivotal movement with respect to the draft frame, said means being automatically releasable upon the application of a predetermined torque on the planter to permit pivotal movement of the planter with respect to the draft frame.

4. A tractor attached planter comprising, in combination with a tractor, a rearwardly extending draft frame pivotally connected to the tractor forwardly of the rear tread of the traction wheels, an implement frame structure pivotally connected on a vertical axis rearwardly of the rear tread of the traction wheels to said draft frame, and latch means for holding the frame structure against pivotal movement with respect to the draft frame, said latch means including means operable to release the frame structure for pivotal movement upon application of a predetermined torque thereto about a vertical axis.

5. A tractor attached planter comprising, in combination with a tractor, a rearwardly extending draft frame pivotally connected to the tractor forwardly of the rear tread of the traction wheels, a planter frame structure pivotally connected on a vertical axis rearwardly of the rear tread of the traction wheels to said draft frame, latch means for holding the planter frame structure against pivotal movement with respect to the draft frame, said latch means including means operable to release the frame structure for pivotal movement upon application of a predetermined torque thereto about a vertical axis, a check-row planter mounted on the frame structure including a check wire support, and transversely spaced check wire guide sheaves mounted on the planter frame structure.

6. A tractor attached planter comprising, in combination with a tractor, a rearwardly extending draft frame pivotally connected to the tractor forwardly of the rear tread of the traction wheels, an implement frame structure pivotally connected on a vertical axis to said draft frame rearwardly of the transverse pivot, and latch means for holding the frame structure against pivotal movement with respect to the draft frame, said latch means including means operable to release the frame structure for pivotal movement for short turns of the tractor.

7. A tractor attached planter comprising, in combination with a tractor, a check row planter secured to the tractor at the rear thereof, said planter being provided with means for carrying a check wire, means for connecting the planter to the tractor including means for holding the planter against angular movement with respect to the tractor during normal planting operation in a straight line, and means for releasing said planter for pivotal movement with respect to the tractor for short turns.

8. In a tractor attached check row planter utilizing a check wire, draft means connecting the planter and the tractor, said draft means including a pivot whereby the planter may swing relative to the tractor about a vertical axis, and means for locking the planter against swinging movement about said axis whereby the planter is fixed with respect to the tractor against relative movement about a vertical axis and whereby side draft on the implement is transmitted to the tractor.

9. In a tractor attached implement, draft means connecting the implement and the tractor, said draft means including a pivot whereby the implement may swing relative to the tractor about a vertical axis, and releasable means for locking the implement against swinging movement about said axis whereby the implement is fixed with respect to the tractor against relative movement about a vertical axis and whereby normal side draft on the implement is transmitted to the tractor, said releasable means including means operable by torque applied by the implement about its vertical pivot for releasing the locking means whereby upon the application of a predetermined maximum side draft the locking means is released.

10. In a tractor attached check row planter utilizing a check wire, draft means connecting the planter and the tractor, said draft means including a pivot whereby the planter may swing relative to the tractor about a vertical axis, releasable means for locking the planter against swinging movement about said axis whereby the planter is fixed with respect to the tractor against relative movement about a vertical axis, said releasable means including means operable by torque applied by the implement about its vertical pivot axis for releasing the locking means whereby normal side draft on the implement is transmitted to the tractor and whereby upon the application of a predetermined maximum side draft the locking means is released.

11. A tractor attached planter comprising, in combination with a tractor, a planter positioned behind the tractor and pivotally connected thereto, check wire sheaves positioned at laterally spaced points on the planter for carrying a check wire received at one side of the tractor and delivered at a laterally spaced location therefrom, and means for locking the planter against movement about a vertical axis with respect to the tractor whereby side draft on the planter is transmitted to the tractor, said locking means including mechanism releasable to permit pivoting of the planter for short turns of the tractor.

12. A tractor attached planter comprising, in combination with a tractor, a planter positioned behind the tractor and pivotally connected thereto, check wire sheaves positioned at laterally spaced points on the planter for carrying a check wire received at one side of the tractor and delivered at a laterally spaced location therefrom, and means for locking the planter against movement about a vertical axis with respect to the tractor whereby side draft on the planter is transmitted to the tractor, said locking means including mechanism releasable by the application of a predetermined torque to the planter.

RUSSEL D. ACTON.